United States Patent [19]

Street et al.

[11] Patent Number: 5,469,808
[45] Date of Patent: Nov. 28, 1995

[54] ANIMAL STALL

[75] Inventors: Michael J. Street, Bedford; Toby T. F. Mottram, Somerset, both of England

[73] Assignee: British Technology Group Ltd., London, England

[21] Appl. No.: 66,145

[22] PCT Filed: Oct. 18, 1991

[86] PCT No.: PCT/GB91/01831

§ 371 Date: May 26, 1993

§ 102(e) Date: May 26, 1993

[87] PCT Pub. No.: WO92/06588

PCT Pub. Date: Apr. 30, 1992

[30] Foreign Application Priority Data

Oct. 19, 1990 [GB] United Kingdom ............ 9022804

[51] Int. Cl.$^6$ .................................................. A01K 1/12
[52] U.S. Cl. ................................................ 119/27; 119/14.03
[58] Field of Search ........................ 119/14.02, 14.03, 119/14.08, 27

[56] References Cited

U.S. PATENT DOCUMENTS 2,081,947  6/1937  McCornack ............ 119/14.03
3,127,871  4/1964  Jorgensen, Jr. ........ 119/14.03 X
3,792,686  2/1974  Needham et al. ........ 119/27 X
4,217,860  8/1980  Goggler ................ 119/27
4,350,117  9/1982  Hacker ................. 119/27
4,763,605  8/1988  Braum ................. 119/14.03
5,069,160  12/1991 Street et al. .......... 119/14.08

FOREIGN PATENT DOCUMENTS 188303   7/1986  European Pat. Off. .
191517   8/1986  European Pat. Off. .
2605841  5/1988  France .
WO90/07268  7/1990  WIPO .

Primary Examiner—Robert P. Swiatek
Attorney, Agent, or Firm—Cushman, Darby & Cushman

[57] ABSTRACT

An animal stall in which an animal is presented for milking with the udder and teats moved forward from the position when the animal stands normally to a position improving access for milking including a forward floor part fixable higher than a rear, entry, floor part whereby the animal adopts a posture other than that of the animal on a level floor.

7 Claims, 4 Drawing Sheets

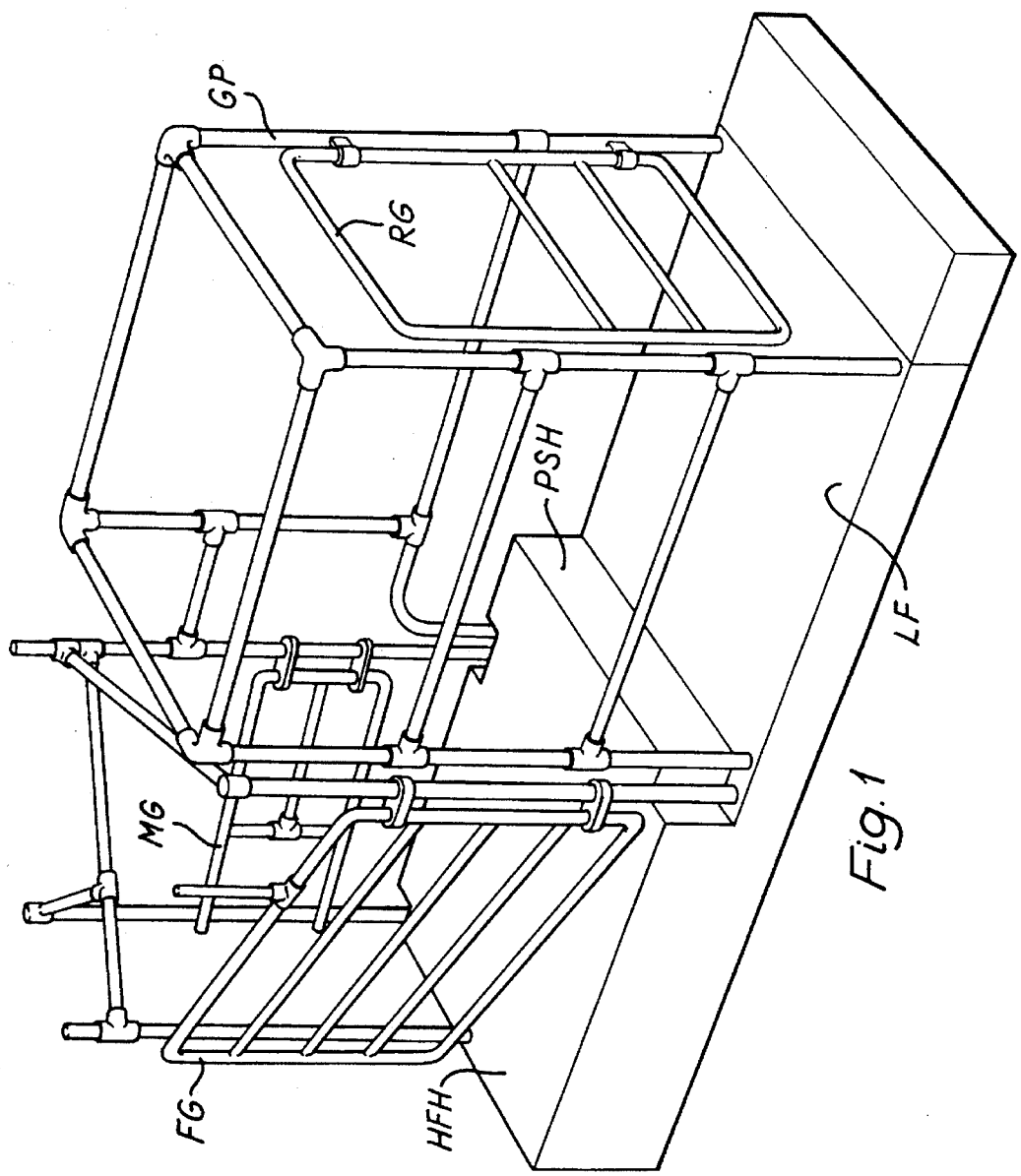
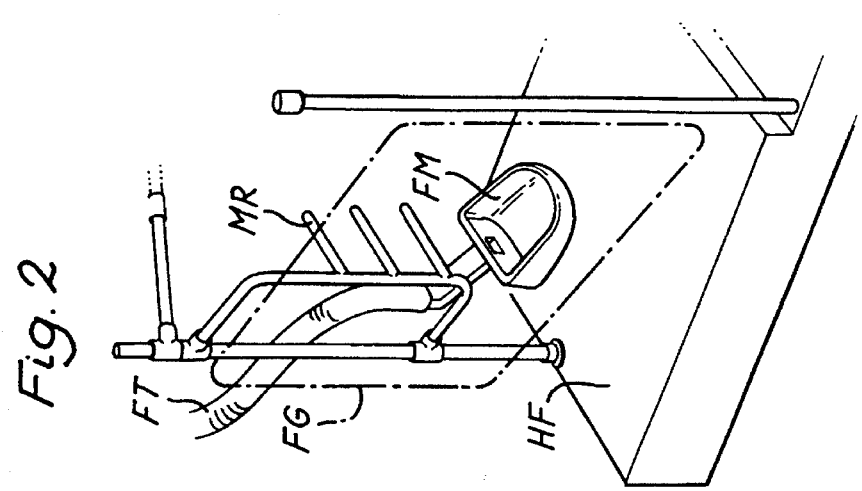

ANIMAL STALL

FIELD OF THE INVENTION

This invention relates to a stall to receive an animal and more particularly to a stall in which an animal is received for milking, especially milking by an automatic procedure.

BACKGROUND OF THE RELATED ART

The general techniques of automatic milking are widely known.

It is convenient that an animal to be milked by an automatic procedure is restrained to some degree as, unless the animal is very docile, it is likely to move so much that the milking procedure is interrupted. On the other hand too much or too severe restraint is very likely to upset the animal causing excessive movement and possibly affecting milk yields. For automatic milking it is important that the animal is not deterred from entering a milking stall. In automatic milking procedures animals are free to present themselves for milking at any time. If the animal has not been milked recently it will be admitted to a stall, prepared for milking and have the teat cluster attached, all by machinery without human intervention. The quick and reliable attachment of the teat cluster is an important phase and if the animal is restless attachment is made more difficult as the teats move and the teat cluster can not always "track" the teats rapidly enough.

The design of the stall has been found to have considerable effect on the readiness of animals to present themselves for an automatic milking procedure and on the behaviour of the animal during milking by such a procedure. The stall design can thus have a significant adverse effect on the benefit expected from automatic milking procedures if the design makes the animals feel uncomfortable.

One approach for stall design for automatic milking is to closely constrain the animal by making the stall a close fit to the animal. This will reduce teat movement resulting from movement of the animal as a whole but the close fit of the stall makes the animal restless and movement of individual legs, which is still possible, can cause significant teat movement. If the leg movements become kicks the milking equipment may be damaged or the animal injured.

Another approach is to constrain the rear feet so that the rear legs are relatively still and, as a result, the teats should not move much. However the constraints, such as cross-wise slopes or barriers to urge the feet apart or claws to restrain the feet, are not very attractive from the animal welfare aspect and are not very effective unless extremely restrictive, with the above disadvantages resulting from restless animals.

EP-A1-0191517 shows an arrangement in which a portion of stall floor beneath an animal in the stall can be pivoted rearwardly up against the front of the rear legs to control the position of the legs and a further portion of floor, on which the rear legs are placed, slideable rearwardly to move the rear legs rearwardly. Separately or in combination these moving parts force the animal to adopt a position in which the rear of the animal is held against a position determining buffer and in which the rear legs are moved to the rear to improve the access to the udder. Another rearwardly pivotable plate can act similarly to the first one but against the front legs.

Such an arrangement exerts considerable restraint on the animal and this, with the movement of the floor while the animal is on it, is unlikely, in accordance with present understanding, to encourage the animal to readily enter the stall or remain in a quiet state for milking.

FR-A-2605841 discloses a mobile animal stall for a rotating milking parlour. The animal enters the stall for milking, the stall is then moved in a circular path while milking takes place. The particular feature of the stall is a floor, the front part of which moves once the animal is in place in the stall. On entering the stall the animal is encouraged by the placing of a food trough to place its neck in a latch which prevents the animal from leaving the stall. The front part of the floor, on which the front legs of the animal stand, is then raised. This compels the animal to move its back legs apart and, so as not to fall because of the transfer of the weight of the animal to rear, not to raise the back legs. Secured in this position the attachment of teat cups is facilitated by the moved-apart back legs.

Again such an arrangement is considered unlikely to encourage the animal to enter the stall or remain quiet for milking both because of the considerable restraint and the movement of the floor when the animal is standing on it.

Furthermore both such arrangements require complicated mechanisms which are bulky and not appropriate to the arduous conditions of a milking parlour.

SUMMARY OF THE INVENTION

It is an object of the present invention to provide an animal stall which mitigates the above shortcomings particularly for use with automatic milking techniques.

According to the invention there is provided an animal stall including fixed means in the floor of the stall to encourage an animal in the stall to raise its fore part with respect to its rear part and thereby improve milking access to the udder and teats.

According to the invention there is provided an animal stall including fixed means in the floor of the stall to encourage an animal in the stall to increase the angle between the rear legs and the underside of the body of the animal to improve milking access to the udder and teats.

More particularly the invention provides an animal milking stall for automatic milking apparatus use in which an area of the floor of the stall for the front legs of the animal is fixed higher than an area for the rear legs of the animal. Generally the higher area may be a single part but could be in more than one part.

Conveniently the two areas of the floor of the stall are fixed level flat surfaces with a visible step between. The step may be a vertical or sloping surface.

Advantageously the floor has anti-slip properties such as a roughened surface or numerous localized humps. The floor may be perforated for drainage.

According to the invention there is also provided a method of automatic milking of an animal including encouraging or permitting an animal to enter a milking stall, visually stimulating said animal to present itself at a milking position in a posture higher at the front of the animal than the posture standing on a level floor, improving the access to the udder and teats.

The posture may also encourage the animal to move the rear legs apart. The posture may also encourage the animal to move a specific rear leg forwardly of the other.

The method may include causing a milking apparatus including at least one teat cup to approach the udder and teats from the side of the animal and between the front and rear legs to apply said at least one teat cup to a teat of the animal by a movement in a direction generally from the front to the rear of the animal presented in said posture.

The method may include moving a manger in a direction lengthwise of the stall to encourage or permit the animal to present itself in the required posture. The manger may also be moved crosswise of the stall to encourage or permit the animal to turn its head and bend its body to one side, thereby moving one rear leg forwardly of the other.

According to the invention there is provided a method of non-invasively encouraging an animal to present itself in a stall in a required posture for automatic milking including providing a stall with a front part of the floor fixed higher than a rear part, opening the rear of the stall for entry of the animal into the stall, provisioning a manger at the front of the stall, moving the manger towards the front of the stall, closing the rear of the stall after entry of the animal into the stall, encouraging or permitting the animal to adopt a posture with the front feet on the higher part of the floor, moving the manger rearwardly to move the animal to the rear of the stall, maintaining said posture.

The invention further provides an animal stall in which an animal is presented for milking with the udder and teats moved forward from the position when the animal stands normally to a position improving access for milking by including a forward floor part fixed higher than a rear, entry, floor part whereby the animal adopts a posture other than that of the animal on a level floor.

When the front legs of the animal are higher than the rear legs the feet of the front legs are typically in the range 50 to 250 millimetres higher than the feet of the rear legs, but lesser or greater heights may be used. Preferably no sideways constraints are applied to the legs or feet of the animal, although sideways guidance may be applied to the body of the animal. Conveniently there are means to apply such body guidance directly or indirectly in the lengthwise direction of the animal.

The floor may be in sectional form, some part or parts providing a fixed higher floor level than other part or parts. The higher floor level may be provided by laying a floor part on a floor of lower level.

According to a particular aspect of the invention the stall includes a manger movable in the lengthwise direction of the stall.

The stall may include means to firstly move the manger away from the animal as it enters the stall through a closable entry and secondly move the manger towards the animal in the stall when the entry is closed, whereby the animal adopts an arched position improving access to the udder and teats for an automatic milking apparatus.

There may be a rail behind which the manger may be withdrawn to prevent access by an animal in the stall.

BRIEF DESCRIPTION OF THE DRAWINGS

Embodiments of the invention will now be described with reference to the accompanying drawings in which:

FIG. 1 is a general view of an animal stall according to the invention,

FIG. 2 shows a manger arrangement for an animal stall such as that in FIGS. 1 and 8 or that in FIGS. 2 to 7.

DESCRIPTION OF PREFERRED EMBODIMENTS

Referring initially to FIG. 1 but incorporating the other Figures as required the animal stall for automatic milking use is a simple robust basic frame, conveniently of tubular metal, and constructed for long life and easy cleaning in the harsh environment of a milking parlour, where none-the-less cleanliness is vital.

For a cow the stall is about two metres long, one metre wide and one and half metres high. As shown the stall has one part about one metre long of rectangular form and the other part of similar length but of asymmetrically tapering form. There is an entry gate at the rear into the part of rectangular form and an exit gate from the side of the tapering part. The size of the rectangular part conforms generally to the body of the animal and the tapering part to the head and neck of the animal. The exact constructional details of the stall are generally not critical except as mentioned above and where set out below, being adaptable to available or preferred materials and constructional techniques.

The stall shows a very important feature of the invention in that the floor has one area fixed and visibly higher than the other. The area of the floor where the front feet of the animal are placed when the animal is in the stall is some 50 to at least 150 millimetres (PS) higher than that where the rear feet are placed. As shown the floor areas are raised to appropriate heights above the floor but it may be that the floor for the rear feet is level with the surroundings. Also as shown there is a step for the difference in floor height but a local steep slope may be used. Greater front floor heights (PSH) of 200 millimetres or more, as described below, may be used. The area for the front feet may be in one or more parts.

In use of the stall for automatic milking an automatic milking machine approaches the udder of a cow in the stall to apply teat cups to the teats on the udder. Because the animal is standing with the front feet and therefore the front part of the animal higher than the rear feet and the rear part the udder is swung forward by the increase in the angle between the underside of the animal and the rear legs significantly easing the access to the rear teats which are otherwise shielded in between the rear legs. Also animals standing with the front feet higher move the rear legs apart, again easing access to the udder.

The invention provides this improved posture of the animal by a front part of the floor raised in relation to the shape of the stall. This passive method of posture control avoids the active controls used hitherto in that the animal in a stall embodying the invention receives non-invasive encouragement to adopt the posture and is not tightly constrained and thus caused to be restive. Importantly the head of the animal is not constrained and can be turned freely, even to look backwards. Techniques used hitherto require the head to be tightly held, which is likely to disturb an animal.

Figure 3:
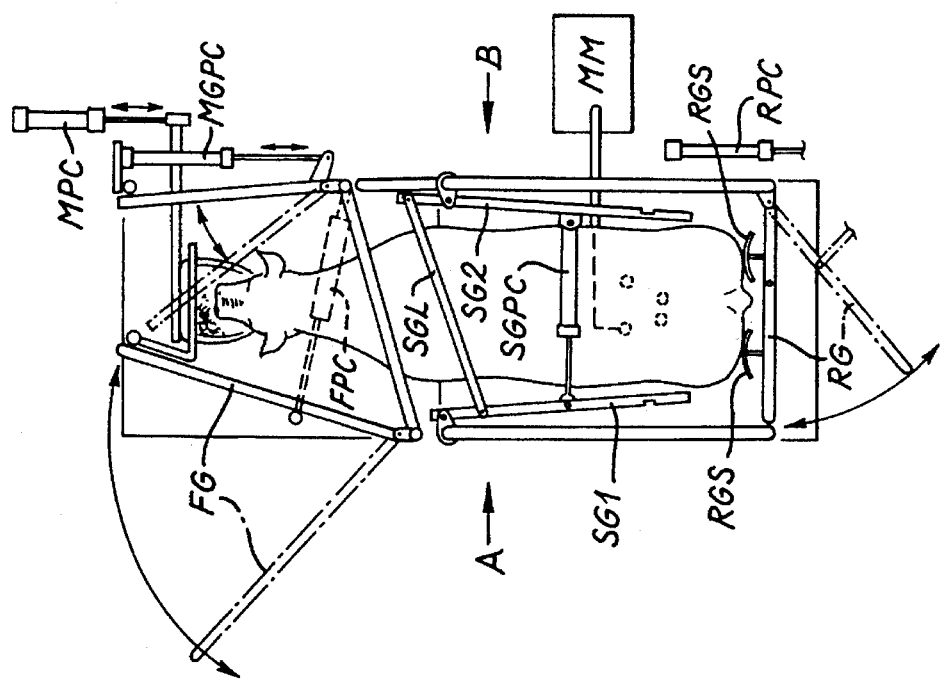
FIG. 3 shows a simplified plan view of an animal stall according to the invention.

The plan view of FIG. 3 indicates the general position of an automatic milking machine, as described in published patent application GB A 2226941, the contents of which are incorporated herein by reference. The milking machine, at MM, swings teat cups, one or more at a time, under the animal behind the front legs to approach the udder from the front to attach the teat cups under the control of the milking machine and appropriate sensors. The operation of the milking machine is integrated with the operation of the stall by a sequence of control instructions, conveniently contained in a sequence of instructions in a small computer. Clearly other milking arrangements may be used.

The entry of an animal into the stall is a convenient basis for describing various features of the stall. As is known in automatic milking techniques animals present themselves for milking when they wish but can only enter for milking when sufficient time has elapsed from an earlier milking. Conveniently a checking stall precedes the milking stall so that animals not ready for milking are diverted from causing congestion at the entry to the actual milking stall. Assuming a presenting animal is to be milked rear gate RG is opened by a suitable linkage, not shown in detail, and pneumatic piston and cylinder RPC. This action may be under the control of a photocell arrangement (not shown). A quantity of feed is dispensed into an angled feed manger FM through feed tube FT by a hopper (not shown) controlled by the instruction sequence mentioned above. The animal, encouraged if needed by the feed now in the manger, enters the stall. Front gate FG is, of course, shut at present. The feed manger FM is movable lengthwise of the stall by a piston and cylinder MPC. A manger rail MR is fixed in the stall so that the manger can be withdrawn from access by the animal if required. A manger gate MG is described later but is, at first, flush with the side of the stall as in FIG. 1.

As the animal enters the stall via open rear gate RG to approach the manger, the manger, which is initially in the rearmost or a rearward position, is moved forward to lead the animal into the stall and may be shut off from the animal by manger rail MR. The animal thus moves forward, sees the fixed step PS or PSH to the higher floor part HF or HFH and places its front feet on the higher floor part in seeking to reach the manger. By now the animal is inside the stall and rear gate RG can be shut by action of the piston and cylinder RPC. The linkage for the rear gate is arranged to lock the gate against an animal in the stall backing out. The manger FM is moved rearwards for access by the animal. To ensure that the animal is not too far into the stall the manger can be moved rearwardly until the rear of the animal is pushed against the now closed rear gate RG. This can be sensed as described below. The transition between the low floor, LF, and the high floor, HF, HFH, must be placed so that the animal has to keep the front feet on the high floor but be at the back of the stall. It may be that if animals of very different sizes are to be milked the transition point has to be varied e.g. by raising or lowering portions of the floor, such as cross-wise strips STR, shown in FIG. 8, which are then, at least temporarily, fixed in position before the animal enters and sees the strips. This may be done in response to the checking of the animal presenting for milking, when the size will be known. Suitable sensors will be readily apparent.

Figure 4:
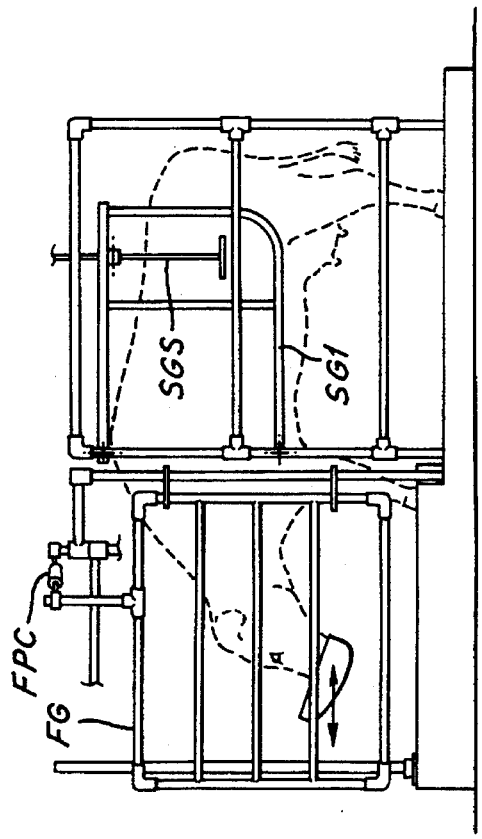
FIGS. 4 and 5 show side views, also simplified, of FIG. 3 respectively from directions A and B of FIG. 3, FIGS. 6 and 7 show details of other parts of the stall of FIG. 3.

FIGS. 3 and 4 show the posture which the invention encourages the animal to adopt, the head forward and down into the manger set at an angle, the front feet raised to raise the line of the back above the horizontal and thus increase the angle between the body and the rear legs to swing the udder forward to reveal the rear teats. A space of some 50 millimetres between each teat and the nearest leg is preferred. This posture is believed to be comfortable for cows, as these animals readily stand for some time with their front feet on a surface higher than their rear feet and are observed to be calm in a stall which embodies the invention. It is helpful if an animal can be still for five to ten seconds at a time to permit attachment of a teat cup.

The animal having the required posture, with an adjustment of the manger if needed, the milking machine can be put into action to attach the teat cups to the teats, milk the animal and detach and withdraw the teat cups. This process can be one of several now known and is only described further where relevant.

The stall is provided with side guides, SG1 and SG2 linked by link SGL, which close gently on the animal when it is in the stall, through the action of a piston and cylinder SGPC. (It should be noted that all the pistons and cylinders are fitted with position transducers so that their action and position can be checked and used by the control instruction sequence.) The action of the piston and cylinder centralizes the animal in the stall by gentle pressure under the control of sensors SGS and the control instruction sequence.

Similarly the rear gate, pivoted on frame part GP, has rear gate sensors RGS which ensure that the animal is caused to be at the rearward position in the stall for example by sending control signals to move the manger.

Information from the sensors SGS and RGS is used to guide the milking machine when seeking to attach the teat cups, although the final seeking is conveniently via sensors on a teat cup carrier. The manger movement can also be used and sensed if needed. The sensors SGS and RGS include pistons and cylinders and position transducers as mentioned above.

Figure 6:
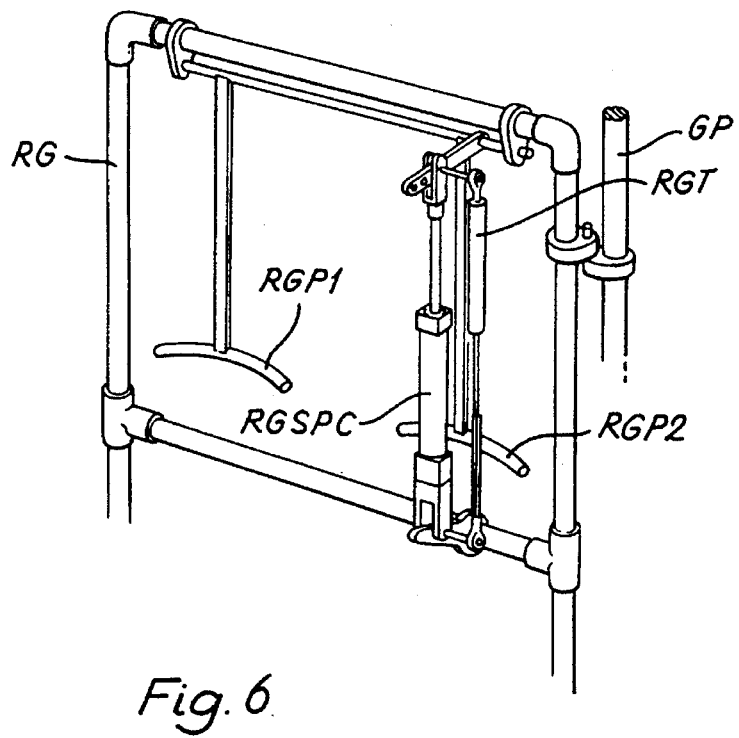

FIG. 6 shows details of the sensor RGS. Two "paddles" RGP1, RGP2 are pivoted on the gate from a common shaft and linked via an arm fast to the shaft to a piston and cylinder arrangement RGSPC. The position of the paddles is sensed by position transducer RGT attached between the link arm and the gate.

Figure 7:
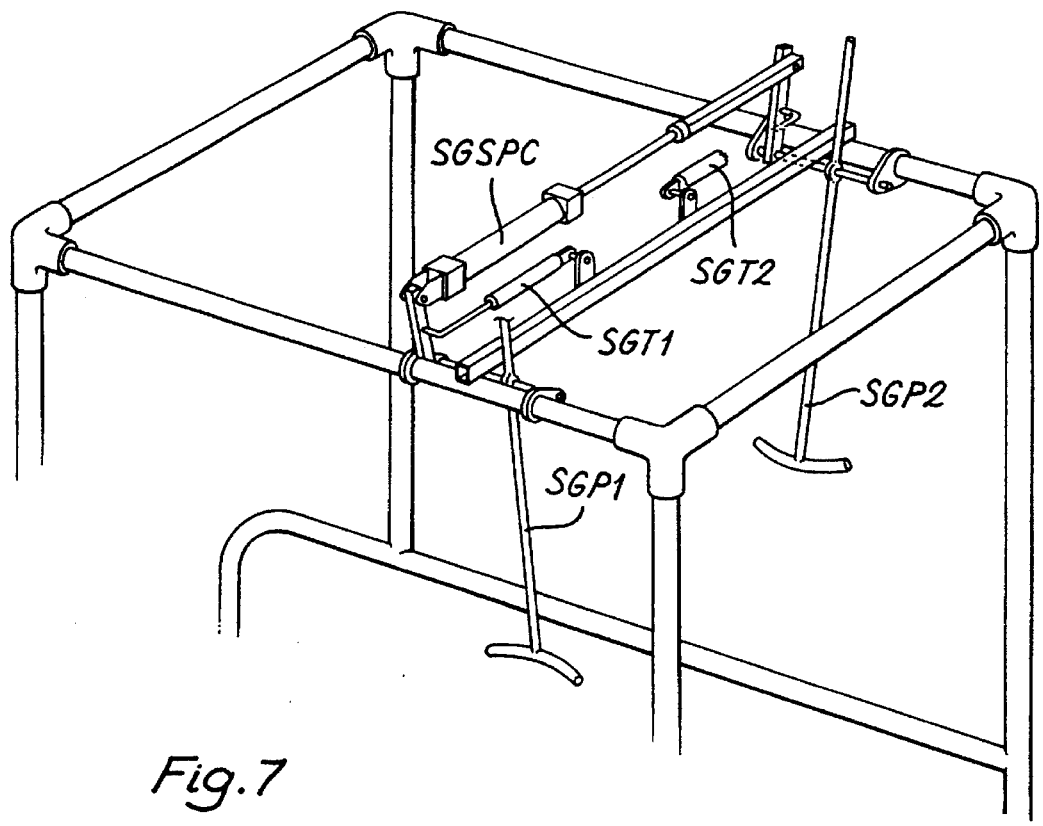

FIG. 7 shows details of the sensor SGS. Two "paddles" SGP1, SGP2 are pivotted on the stall frame on respective shafts and linked via arms fast to the shafts to a piston and cylinder arrangement SGSPC. The positions of the paddles are sensed by position transducers SGT1, SGT2 attached between the link arms and the stall frame.

In operation the side guides SG1, SG2 close gently on the animal and the sensor paddles SGP1, SGP2 are urged against the animal by cylinder SGSPC. The position of the animal in the sideways sense can then be tracked by the transducers connected to the paddles. Notches in the side guides clear the movement of the paddles.

Once milking is finished the teat cups are withdrawn from the udder and the animal can be released. To do this the manger FM is moved forward to be obstructed by the manger rail MR and the front gate FG opened. A manger gate MG can be used if needed to further obstruct the manger and urge the head of the animal toward the open gate FG. Front gate FG is operated by piston and cylinder FPC and manger gate MG by piston and cylinder MGPC. The animal leaves the stall through gate FG and the cycle of entry and milking can continue with another animal. In an emergency, or if the pneumatic supply fails, gate FG can be pushed open by an animal.

A photoelectric sensor (not shown) can be arrangd to sense the presence of an animal in the stall so that entry of another animal, even into a checking stall, can be delayed.

It is assumed that all the appropriate washing and other hygiene measures will be applied, as is well-known in the art.

As shown in the drawings the milking machine enters the stall from the side shown in FIG. 4 and a large aperture is provided in the lower part of the stall framework to give access for the machine. It is convenient that as much as possible of the pneumatic equipment and pneumatic power and electrical signal connections are on the side near the milking machine and control equipment and some complexity of mechanical linkage may be worthwhile to achieve this. The step provided by the raised floor part is very useful in increasing the ease of access under the animal for a milking robot.

Figure 5:
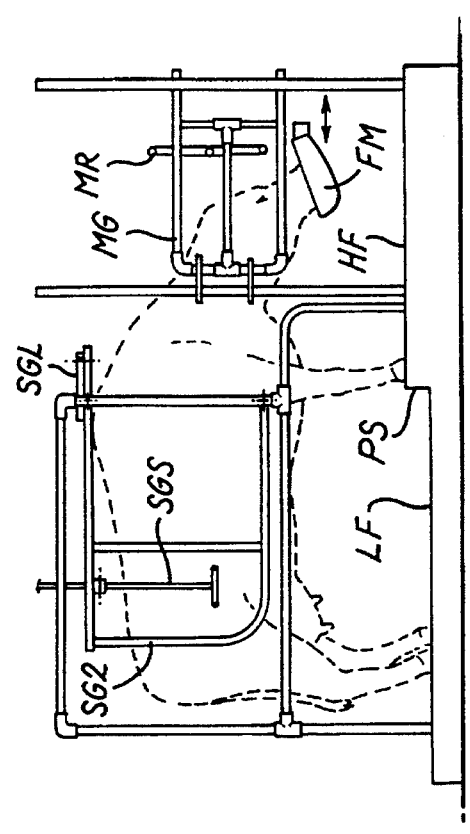

It is possibly useful for the rear leg nearer the milking machine to be encouraged to be on a line to the rear of the leg further from the machine, as shown in FIG. 5. To achieve this selective floor treatment can be used, for example gentle vibration or slight instability of areas which correspond to unwanted feet positions. Another technique is to offset the manger, in the illustrated arrangement, towards gate MG. The offset may be by pivotal or sideways movement. The offset of the manger can encourage the animal to turn to one side in the stall and so move the rear legs to the required position.

Figure 8:
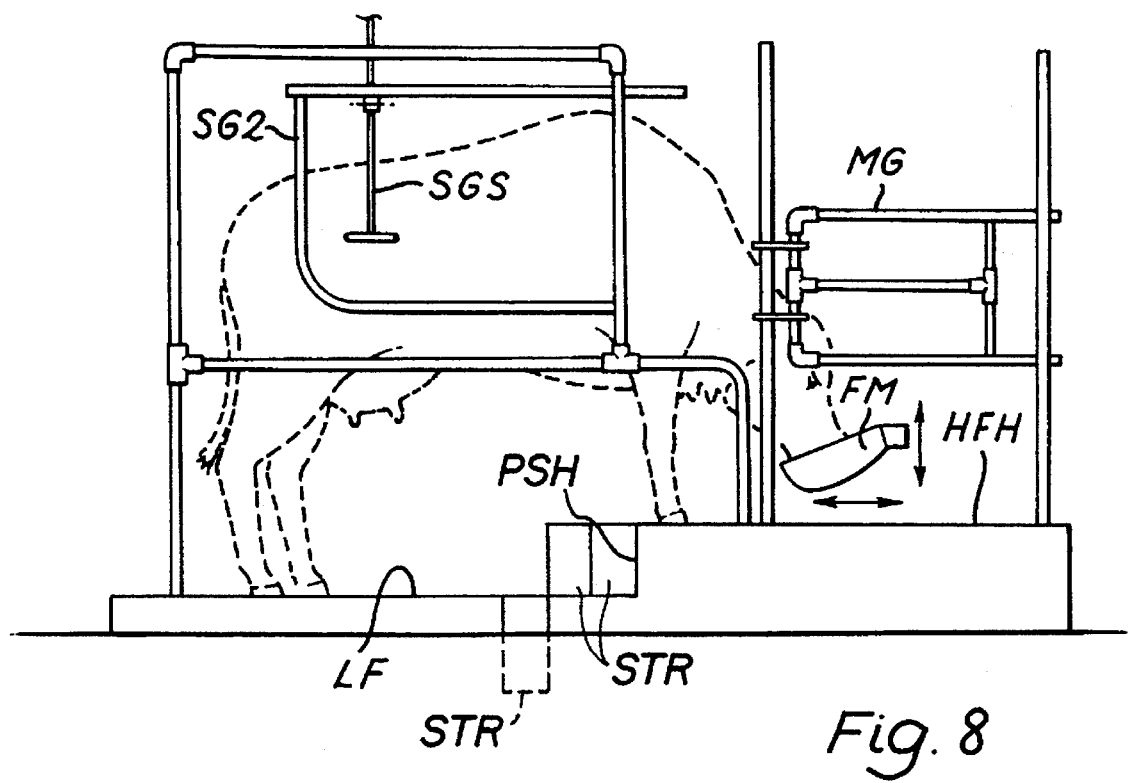
FIG. 8 shows a side view of the stall of FIG. 1.

In the embodiment illustrated in FIGS. 1 and 8 the step, PSH, is of some 200 millimetres. It has been found that the more arched position adopted by an animal when the floor parts have this height difference is even better for milking access, while the manger can be lower, encouraging the position. The vertical and horizontal position, and tilt, of the manger can be controlled as required. This more arched position is found to be very effective in that cows remain calm, possibly because the lower head position is close to the natural grazing position. Features not shown in detail in FIG. 8 are generally similar to those shown in the other Figures.

In one arrangement including a stall embodying the invention together with a checking stall and an automatic milking machine which "picks" individual teat cups from a magazine about half a minute is needed for an animal to enter the stall and adopt the milking posture, with the gates then closed. About one-and-one-half minutes is needed for the four teat cups to be applied singly to the respective teats. Milking takes about five minutes to complete, whereupon the teat cups are released and the animal can leave the stall. By using the well-known "quarter" milking arrangement each quarter of the udder can be milked to the appropriate amount and the teat cup released. "Quarter" milking also keeps the milk from each quarter separate if any checks are required.

Pneumatic operation is used throughout to permit safe, gentle action of the arrangement.

Comparisons have been made between stalls with a "step" floor as described above, and other floor treatments such as lengthwise ridges and "cobbling" of strips across the floor where the cows should not stand. The "step" floor appears to give calmer cows in a more-easily milked posture.

We claim:

1. A method of non-invasively encouraging and permitting an animal to present itself in a stall in a required posture for automatic milking including:

providing the stall with a front part of a floor higher than a rear part of the floor, opening a rear of the stall for entry of the animal into the stall, provisioning a manger disposed in the stall, moving the manger towards the front of the stall, closing the rear of the stall after entry of the animal into the stall, encouraging and permitting the animal to adopt a posture with front feet on the higher part of the floor, and moving the manger rearwardly to move the animal to the rear of the stall, maintaining said posture.

2. A closeable animal stall for milking including:

a closeable entry;

fixed floor means in the floor of the stall, said fixed means comprising a rear entry floor part and a forward floor part of the stall, said forward floor part being fixed higher than said rear entry floor part;

a movable manger; and manger moving means for moving the manger forwardly as the animal enters the stall through said closeable entry to cause the animal to move forwardly and put its front feet on said higher forward floor part and for moving the manger rearwardly after the animal has its front feet on said higher forward floor part and the closeable entry is closed to cause the animal to move rearwardly into a predetermined position adjacent said closeable entry with its front feet still on said higher forward floor part;

the forward and rear entry floor parts being dimensioned such that when the animal is presented for milking it is positioned at a rear of the stall and encouraged to raise its fore-part with respect to its rear part and thereby increase an angle between the rear legs and an underside body of the animal, thereby improving milking access to an udder and teats of the animal;

whereby the animal is in an arched position for improving accommodation to automatic milking apparatus by improved access to the udder and teats.

3. A closeable animal stall for milking including:

a closeable entry; and fixed floor means in the floor of the stall, said fixed means comprising a rear entry floor part and a forward floor part of the stall, said forward floor part being fixed higher than said rear entry floor part, the fixed floor means in the floor of the stall including cross-wise strips for increasing a rearward extension of the fixed higher part of the stall;

the forward and rear entry floor parts being dimensioned such that when the animal is presented for milking it is positioned at a rear of the stall and encouraged to raise its fore-part with respect to its rear part and thereby increase an angle between the rear legs and an underside body of the animal, thereby improving milking access to an udder and teats of the animal.

4. A method of non-invasively encouraging and permitting an animal to be presented in a stall in a required posture for automatic milking, said stall having a floor with a front part higher than a rear floor part, said including the steps of:

opening a rear entry of the stall for entry of the animal into the stall;

provisioning a manger disposed in the stall;

enticing the animal to move forwardly and to adopt a posture with its front feet on the higher front part of the floor by moving the manger towards the front of the stall;

closing the rear of the stall after the animal enters the stall; and moving the manger rearwardly to move the animal to the rear of the stall while maintaining said posture.

5. A method according to claim 4, wherein the step of enticing the animal to move forwardly includes encouraging the animal to move its rear legs apart.

6. A method according to claim 4, wherein the step of enticing the animal to move forwardly includes encouraging the animal to move a specific one of its two rear legs more forwardly than the other rear leg.

7. A method according to claim 4, including the further step of:

causing a milking apparatus including at least one teat cup to approach the animal's udder and teats from a side of the animal and between the animal's front and rear legs to apply the at least one teat cup to one of the teats of the animal by a movement in a direction generally from the front to the rear of the animal presented in said posture.

* * * * *